US012216485B2

(12) United States Patent
Lin

(10) Patent No.: US 12,216,485 B2
(45) Date of Patent: Feb. 4, 2025

(54) OUTPUT CIRCUIT AND RELATED CONTROL METHOD WITH PUMPING COMPENSATION

(71) Applicant: NOVATEK Microelectronics Corp., Hsin-Chu (TW)

(72) Inventor: Jen-Yi Lin, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 17/369,974

(22) Filed: Jul. 8, 2021

(65) Prior Publication Data

US 2023/0010835 A1 Jan. 12, 2023

(51) Int. Cl.
*G05F 1/56* (2006.01)

(52) U.S. Cl.
CPC .................................... *G05F 1/56* (2013.01)

(58) Field of Classification Search
CPC .......... H02M 3/07; H02M 3/073; H02M 7/10; H02M 7/103; H02M 7/106; H02M 1/088; H02M 2003/071; H02M 2003/072; H02M 2003/075; H02M 2003/076; H02M 2003/077; H02M 2003/078; H02M 2001/007; H02M 2001/0048; G05F 1/462; G05F 1/465; G05F 1/468; G05F 1/56; G05F 1/575; G05F 1/562; G05F 1/565; G05F 1/567; G05F 1/569; G05F 1/571; G05F 1/573; G05F 1/5735
See application file for complete search history.

(56) References Cited

U.S. PATENT DOCUMENTS 6,741,099 B1 * 5/2004 Krugly ............ H03K 17/04123 326/82
6,903,538 B2 * 6/2005 Umeda ................ H02M 3/073 323/272
9,899,912 B2 2/2018 Raghupathy
10,073,478 B1 9/2018 Ivanov
10,454,376 B1 * 10/2019 Watanabe ............... H02M 3/07
10,680,514 B2 * 6/2020 Watanabe ............ H02M 3/156
11,196,339 B1 * 12/2021 Jodka ...................... H02M 1/08
2002/0109488 A1 * 8/2002 Umeda ................... H02M 3/07 323/268
2004/0041620 A1 * 3/2004 D'Angelo ............ H05B 45/375 327/534
2005/0174815 A1 * 8/2005 Chen ..................... H02M 3/073 363/60
2007/0146050 A1 * 6/2007 Chen ...................... H02M 3/07 327/536

(Continued)

FOREIGN PATENT DOCUMENTS

TW 200828311 7/2008

*Primary Examiner* — Sean Kayes
*Assistant Examiner* — Nusrat Quddus
(74) *Attorney, Agent, or Firm* — Winston Hsu

(57) ABSTRACT

An output circuit includes an output driver, a voltage regulator, a control circuit and a charge pump circuit. The output driver includes a signal input terminal, a signal output terminal and a first power receiving terminal. The voltage regulator is coupled to the first power receiving terminal of the output driver. The control circuit is coupled to the signal input terminal of the output driver. The charge pump circuit is coupled to the control circuit and the first power receiving terminal of the output driver.

7 Claims, 11 Drawing Sheets

(56) References Cited

U.S. PATENT DOCUMENTS

| | | | | |
|---|---|---|---|---|
| 2009/0015299 | A1* | 1/2009 | Ryu | H03F 1/0211 327/108 |
| 2009/0167418 | A1* | 7/2009 | Raghavan | H02M 3/073 327/536 |
| 2011/0057704 | A1* | 3/2011 | Ptacek | H03K 5/1536 327/307 |
| 2011/0148388 | A1* | 6/2011 | Zanchi | H02M 3/158 323/313 |
| 2015/0061738 | A1* | 3/2015 | Kwon | H02M 3/073 327/157 |
| 2015/0066230 | A1* | 3/2015 | Ulrich | H04L 25/4917 700/295 |
| 2015/0311784 | A1* | 10/2015 | Saadat | H02M 3/07 327/536 |
| 2018/0026629 | A1* | 1/2018 | Ptacek | H02M 3/07 327/109 |
| 2018/0175855 | A1* | 6/2018 | Romano | H03K 17/166 |
| 2018/0212514 | A1* | 7/2018 | Ippolito | H02M 1/15 |
| 2018/0321718 | A1* | 11/2018 | Kaundinya | G06F 1/206 |
| 2018/0352327 | A1* | 12/2018 | Onishi | H04R 3/00 |
| 2019/0028095 | A1* | 1/2019 | Sanchez | H02M 3/07 |
| 2019/0207603 | A1* | 7/2019 | Ptacek | H03K 17/687 |
| 2019/0305686 | A1* | 10/2019 | Watanabe | H02M 3/157 |
| 2020/0285260 | A1* | 9/2020 | Londak | G05F 1/575 |
| 2020/0310746 | A1* | 10/2020 | Kopparapu | G10L 21/06 |
| 2020/0389082 | A1* | 12/2020 | Feng | H02M 1/36 |
| 2021/0083573 | A1* | 3/2021 | Yen | H02M 3/07 |
| 2023/0088177 | A1* | 3/2023 | Giuliano | H02M 3/077 363/60 |

* cited by examiner

OUTPUT CIRCUIT AND RELATED CONTROL METHOD WITH PUMPING COMPENSATION

BACKGROUND OF THE INVENTION

1. Field of the Invention

The present invention relates to an output circuit and a related control method, and more particularly, to an output circuit and a related control method using pumping compensation.

2. Description of the Prior Art

A voltage regulator such as a low-dropout (LDO) regulator is widely used for power supply in an integrated circuit (IC). With the benefit of small ripples in the supply voltage of the voltage regulator, the voltage regulator is usually applied to supply stable power for operations of the circuit. However, if the load circuit of the voltage regulator draws a current rapidly under high speed operations, a large voltage drop may appear on the output voltage of the voltage regulator, resulting in abnormal operations of the load circuit.

In order to solve the problem, a large capacitor is usually disposed to stabilize the output voltage of the voltage regulator. The large capacitor is required to supply enough electric charges to reduce the ripples on the output voltage, and may be in a level of at least tens of nanofarads, which is too large to be implemented in the IC. Therefore, an off-chip capacitor is usually disposed and coupled to the output terminal of the voltage regulator.

Please refer to FIG. 1, which is a schematic diagram of an output circuit 10 disposed with an off-chip capacitor $C_{IO}$. As shown in FIG. 1, the output circuit 10 includes an output driver 102 and an LDO regulator 104. The output driver 102 is configured to output an input/output (I/O) output signal to an external transmission line, which has a capacitive load $C_L$. The LDO regulator 104 may generate an I/O power voltage VDDIO to be supplied to the output driver 102 based on a source voltage AVDD received from a power supply device 110. The off-chip capacitor $C_{IO}$ is coupled to the output terminal of the LDO regulator 104, to stabilize the I/O power voltage VDDIO. In this example, the source voltage AVDD may equal 3.3V and the I/O power voltage VDDIO may equal 1.8V, and the capacitance value of the capacitive load $C_L$ may equal 100 picofarads (pF). If the LDO regulator 104 is configured to drive 5 similar output drivers and the ripples on the I/O power voltage VDDIO are requested to be within 5% of the voltage value, the capacitance value of the off-chip capacitor $C_{IO}$ should be greater than 10 nanofarads (nF), which is too large such that the compensation capacitor cannot be implemented in the IC.

However, the off-chip capacitor usually occupies a large area and increases the system costs. Thus, there is a need for providing a circuit system without the usage of off-chip capacitor for the voltage regulator.

SUMMARY OF THE INVENTION

It is therefore an objective of the present invention to provide an output circuit and a related control method, where a pumping compensation scheme is applied so as to provide compensation charges for supporting the voltage regulator without the usage of off-chip capacitor.

An embodiment of the present invention discloses an output circuit, which comprises an output driver, a voltage regulator, a control circuit and a charge pump circuit. The output driver comprises a signal input terminal, a signal output terminal and a first power receiving terminal. The voltage regulator is coupled to the first power receiving terminal of the output driver. The control circuit is coupled to the signal input terminal of the output driver. The charge pump circuit is coupled to the control circuit and the first power receiving terminal of the output driver.

Another embodiment of the present invention discloses a method for controlling an output circuit, which comprises an output driver and a charge pump circuit. The output driver is configured to process an input/output (I/O) signal switched between a first voltage level and a second voltage level. The charge pump circuit is configured to receive compensation charges from a voltage source when the I/O signal is in the first voltage level, and supply the compensation charges to the output driver when the I/O signal is in the second voltage level.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
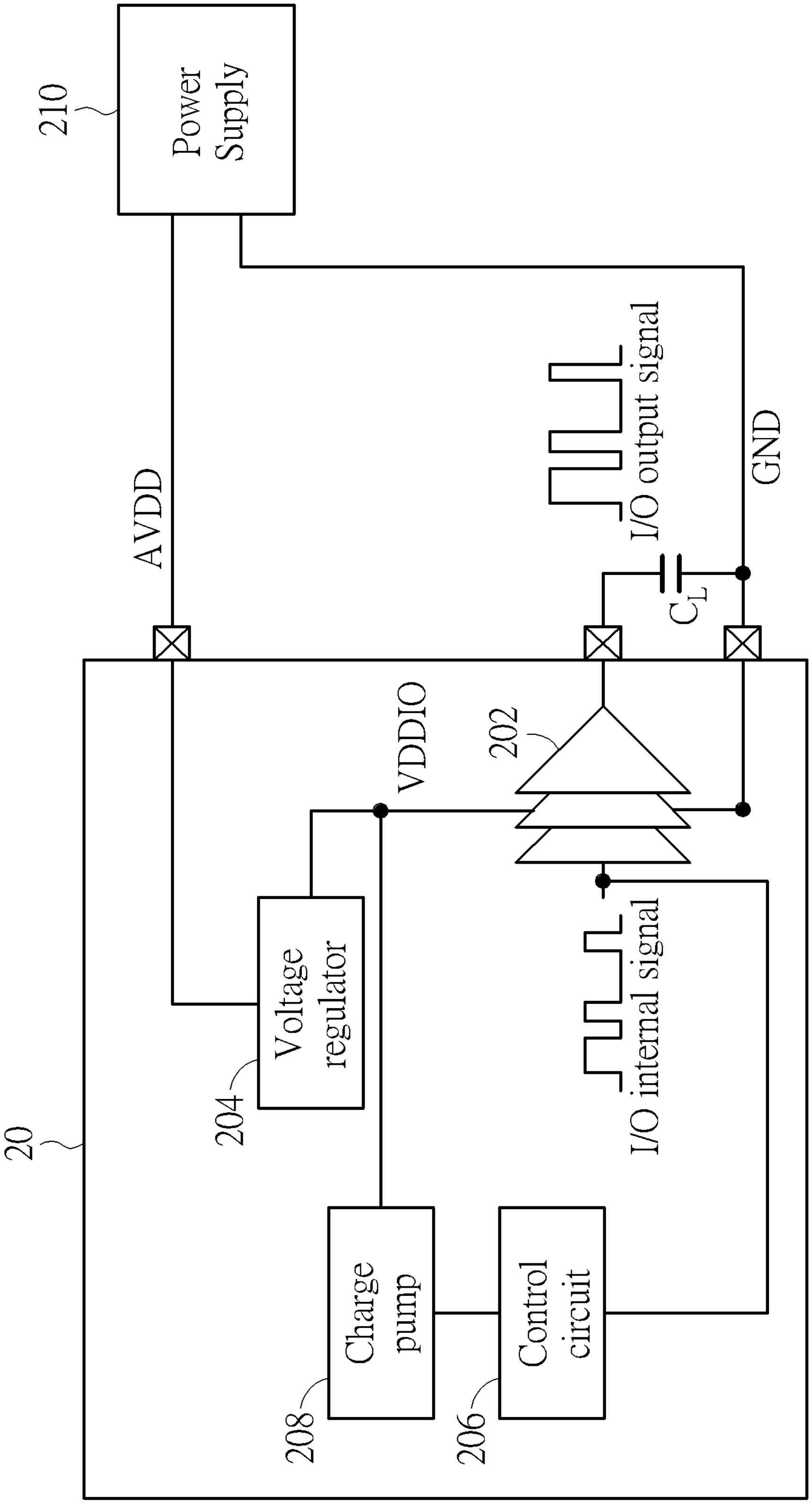
FIG. 2 is a schematic diagram of an output circuit according to an embodiment of the present invention.

Please refer to FIG. 2, which is a schematic diagram of an output circuit 20 according to an embodiment of the present invention. As shown in FIG. 2, the output circuit 20 includes an output driver 202, a voltage regulator 204, a control circuit 206 and a charge pump circuit 208. The output driver 202 is configured to output an input/output (I/O) output signal to an external transmission line, which has a capacitive load $C_L$. More specifically, the output circuit 20 may be in an output port of an integrated circuit (IC). A signal input terminal of the output driver 202 may receive an I/O internal signal from an internal module of the IC, and the output driver 202 may correspondingly output the I/O output signal to the transmission line external to the IC through a signal output terminal. The output driver 202 further includes a first power receiving terminal and a second power receiving terminal. The voltage regulator 204, which is coupled to the first power receiving terminal of the output driver 202, may generate an I/O power voltage VDDIO to be supplied to the output driver 202 through the first power receiving terminal. The second power receiving terminal of the output driver 202 may be a ground terminal for receiving a ground voltage GND. The voltage regulator 204 may further receive a source voltage AVDD from a power supply device 210. In an embodiment, the voltage regulator 204 may be a low-dropout (LDO) regulator.

The control circuit 206 is coupled to the signal input terminal of the output driver 202, and configured to receive the I/O internal signal to be processed by the output driver 202. The control circuit 206 may generate control signals for controlling the charge pump circuit 208 according to the I/O internal signal of the output driver 202. The charge pump circuit 208 is coupled to the control circuit 206 and also coupled to the first power receiving terminal of the output driver 202. Under the control of the control circuit 206, the charge pump circuit 208 may output compensation charges to the first power receiving terminal of the output driver 202 according to the I/O internal signal of the output driver 202. Since the charge pump circuit 208 is capable of supplying compensation charges for stabilizing the I/O power voltage VDDIO supplied from the voltage regulator 204, the off-chip capacitor for the I/O power voltage VDDIO may be omitted.

Figure 1:
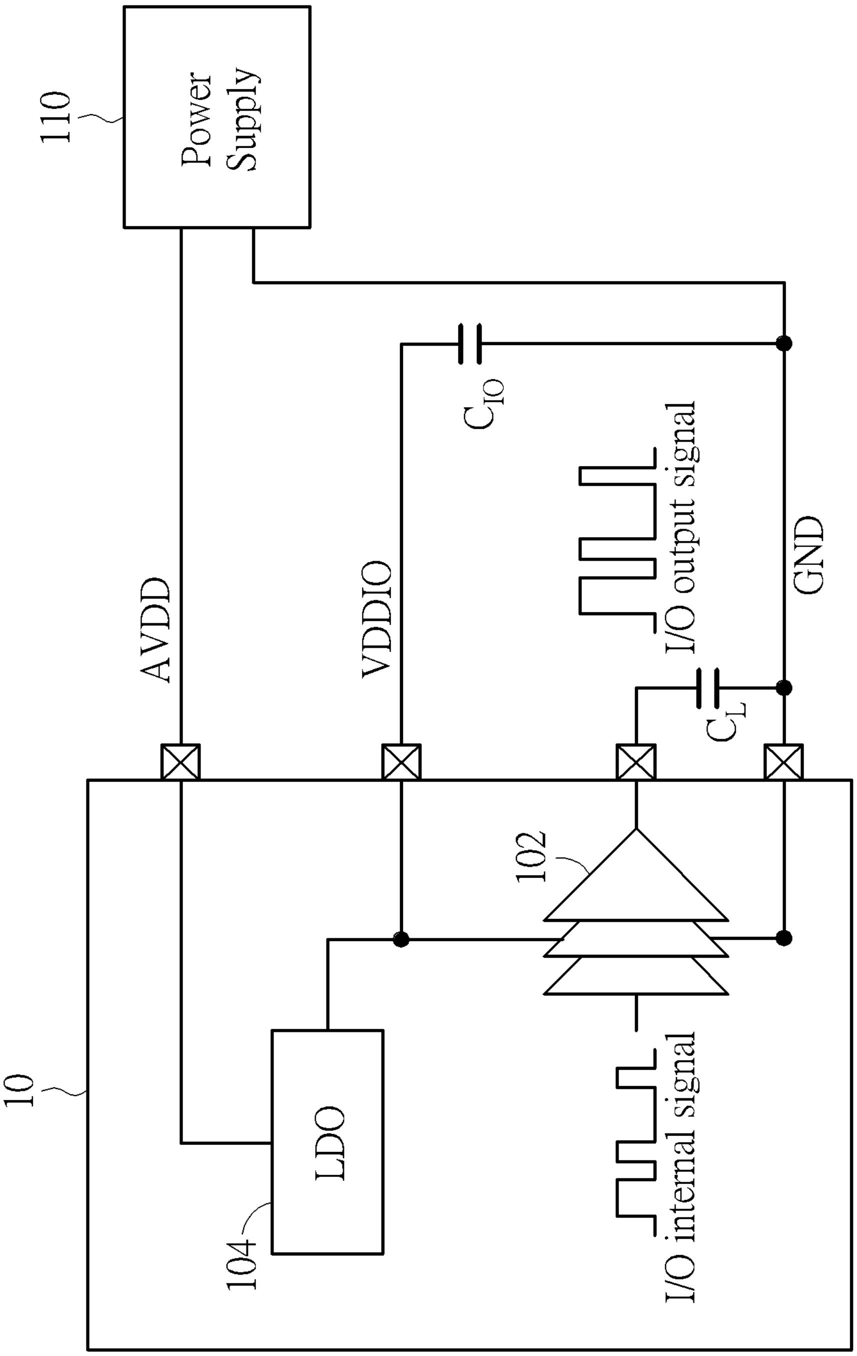
FIG. 1 PRIOR ART
FIG. 1 is a schematic diagram of an output circuit disposed with an off-chip capacitor.

In detail, the output driver 202 may output the I/O output signal to drive the external capacitive load $C_L$. In this embodiment, the output driver 202 is configured to drive a digital output interface, where the I/O output signal from the output driver 202 is a digital signal switched between two voltage levels, as shown in FIG. 2. When the I/O output signal is switched from the lower level to the higher level, the output driver 202 should charge the capacitive load $C_L$; and when the I/O output signal is switched from the higher level to the lower level, the capacitive load $C_L$ may be discharged. The electric charges for charging the capacitive load $C_L$ may be supplied from the voltage regulator 204 through the I/O power voltage VDDIO. However, due to insufficient bandwidth of the voltage regulator 204, the voltage regulator 204 may not be able to rapidly supply enough charges to the output driver 202 for charging the capacitive load $C_L$, especially when the I/O signal is a high speed signal. Therefore, the charge pump circuit 208 may promptly provide compensation charges for the output driver 202, so as to prevent an excessively large drop on the I/O power voltage VDDIO. In other words, the function of the charge pump circuit 208 is similar to the function of the off-chip capacitor $C_{IO}$ as shown in FIG. 1; hence, there is no need to dispose an additional off-chip capacitor for the output circuit 20.

Figure 3:
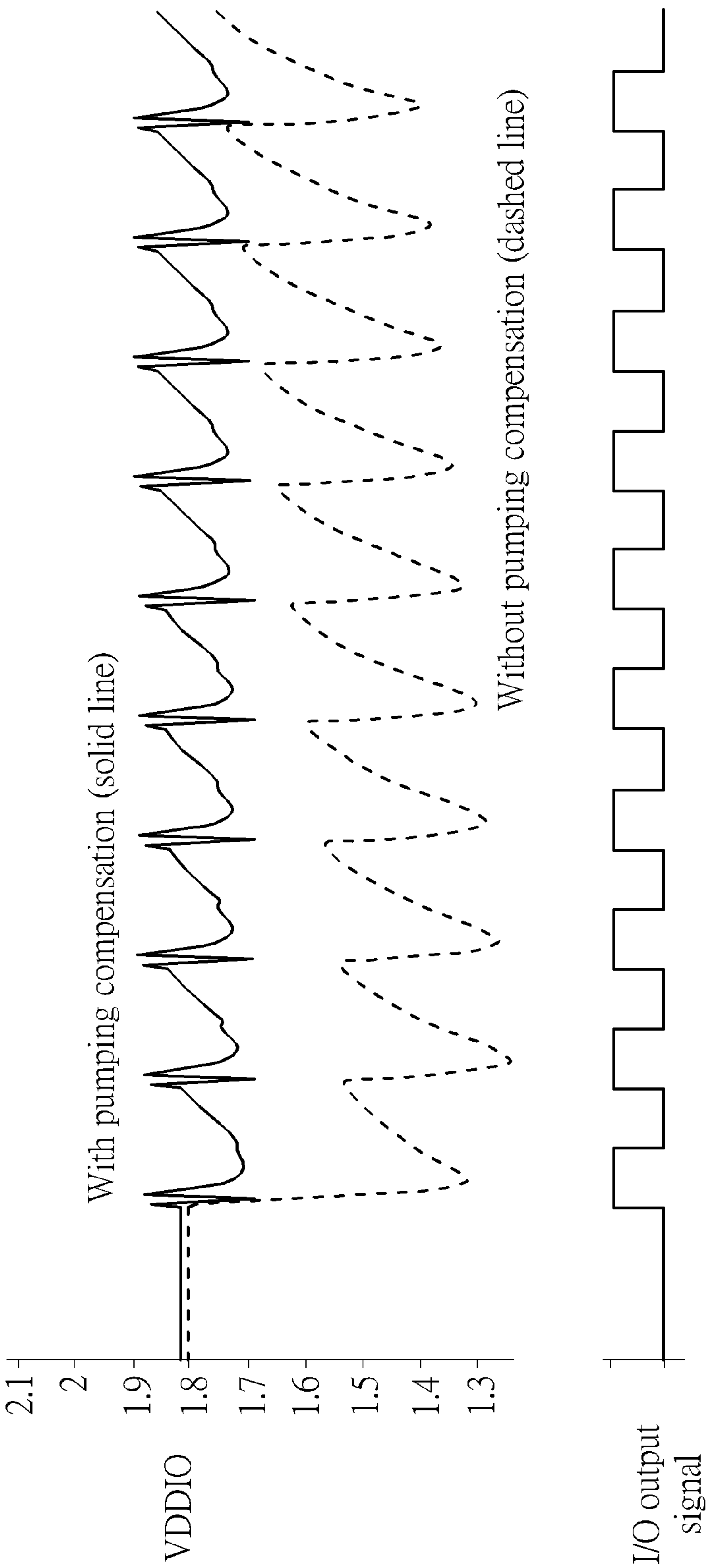
FIG. 3 is a waveform diagram of a comparison of the I/O power voltage with and without pumping compensation.

Please refer to FIG. 3, which is a waveform diagram of a comparison of the I/O power voltage VDDIO with and without pumping compensation. As shown in FIG. 3, the I/O power voltage VDDIO may be set to 1.8V. With the deployment of the charge pump circuit 208 coupled to the first power receiving terminal, the pumping compensation may be performed, so that the voltage level of the I/O power voltage VDDIO may be kept at a satisfactory level. More specifically, when the capacitive load $C_L$ draws electric charges from the output driver 202 as the I/O output signal rises, the pumping operations of the charge pump circuit 208 may supply electric charges rapidly, allowing the I/O power voltage VDDIO to immediately recover to its original level. Therefore, the I/O power voltage VDDIO may be kept at 1.8V with small ripples. In contrast, if there is no pumping compensation of the charge pump circuit and no charge compensation of the off-chip capacitor, the I/O power voltage VDDIO may fall rapidly as the capacitive load $C_L$ draws electric charges from the output driver 202, and may rise back to its original level after a long time since the electric charges are only supplied from the voltage regulator 204 such as the LDO regulator. The I/O output signal may not be forwarded correctly if the I/O power voltage VDDIO decreases to an excessively low level.

Figure 4:
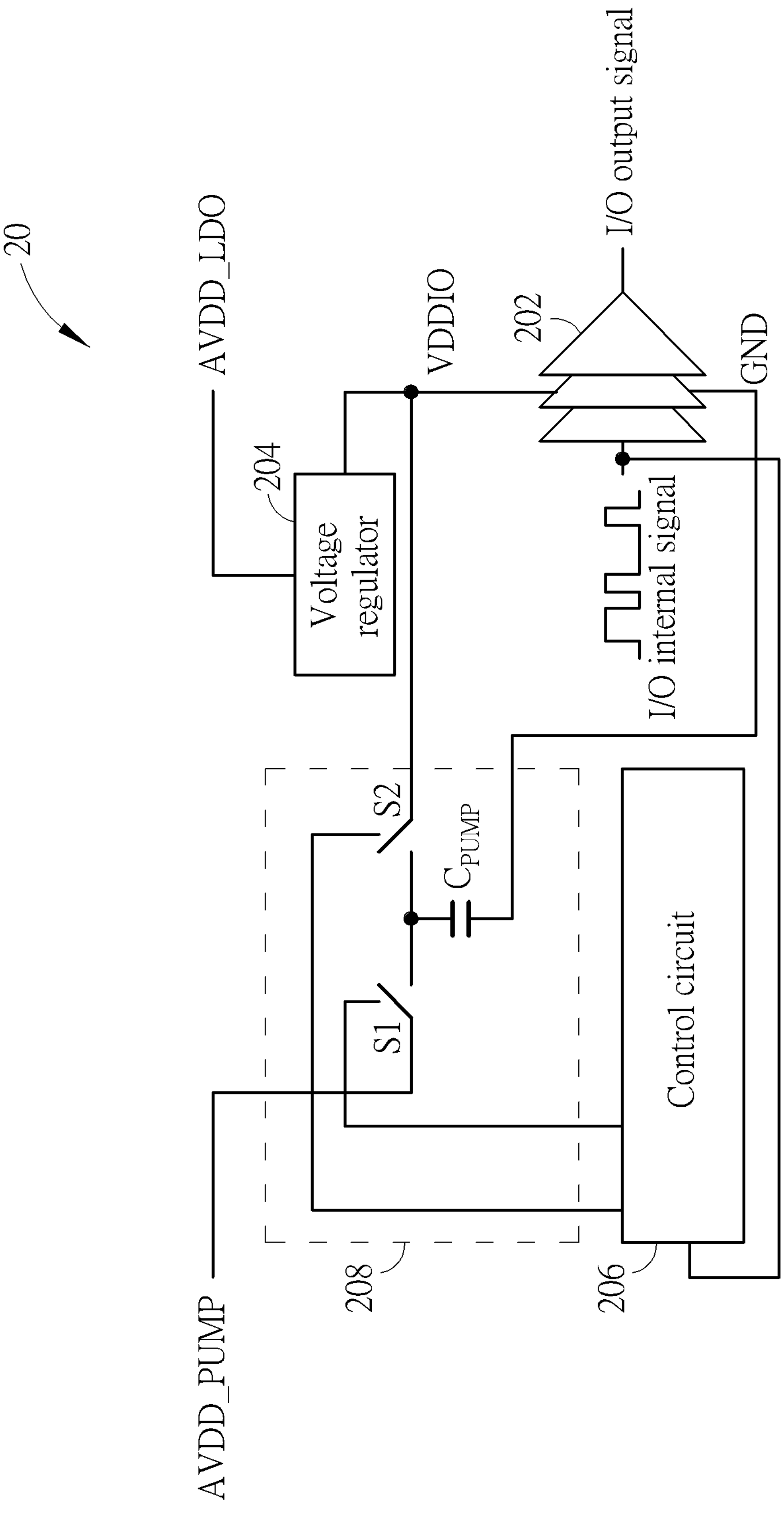
FIG. 4 is a schematic diagram of the output circuit with an exemplary implementation of the charge pump circuit.

FIG. 4 is a schematic diagram of the output circuit 20 with an exemplary implementation of the charge pump circuit 208, which illustrates how the charge pump circuit 208 performs pumping operations to generate the compensation charges for the I/O power voltage VDDIO. In this embodiment, the voltage regulator 204 may be an LDO regulator, which outputs the I/O power voltage VDDIO to the output driver 202 by receiving a source voltage AVDD LDO from a power supply device (not illustrated). The charge pump circuit 208 receives a source voltage AVDD_PUMP from the same or another power supply device, where the level of the source voltage AVDD_PUMP may be the same as or different from the level of the source voltage AVDD LDO.

As shown in FIG. 4, the charge pump circuit 208 includes two switches S1 and S2 and a pumping capacitor $C_{PUMP}$ The switch S1 is coupled to the control circuit 206 and a voltage source that supplies the source voltage AVDD_PUMP, and the switch S2 is coupled to the control circuit 206 and the first power receiving terminal of the output driver 202, allowing the charge pump circuit 208 to supply compensation charges for stabilizing the I/O power voltage VDDIO. The pumping capacitor $C_{PUMP}$ is coupled between the switches S1 and S2. More specifically, a terminal of the pumping capacitor $C_{PUMP}$ is coupled between the switches S1 and S2, and another terminal of the pumping capacitor $C_{PUMP}$ is coupled to the ground terminal.

The control circuit 206 may output control signals to control the switches S1 and S2 according to the I/O internal signal of the output driver 202. More specifically, when the I/O internal signal is switched from the higher level to the lower level, the capacitive load $C_L$ is required to be discharged. At this moment, the switch S1 may be turned on and the switch S2 may be turned off, and the pumping capacitor $C_{PUMP}$ starts to be charged with the source voltage AVDD_PUMP and electric charges will be stored in the pumping capacitor $C_{PUMP}$. When the I/O internal signal is switched from the lower level to the higher level, the capacitive load $C_L$ should be charged by the output driver 202. At this moment, the switch S1 may be turned off and the switch S2 may be turned on, and the electric charges stored in the pumping capacitor $C_{PUMP}$ may be output to the output driver 202, to rapidly charge the capacitive load $C_L$. In such a situation, the charge pump circuit 208 may rapidly supply compensation charges to the output driver 202, so as to stabilize the I/O power voltage VDDIO.

Figure 5:
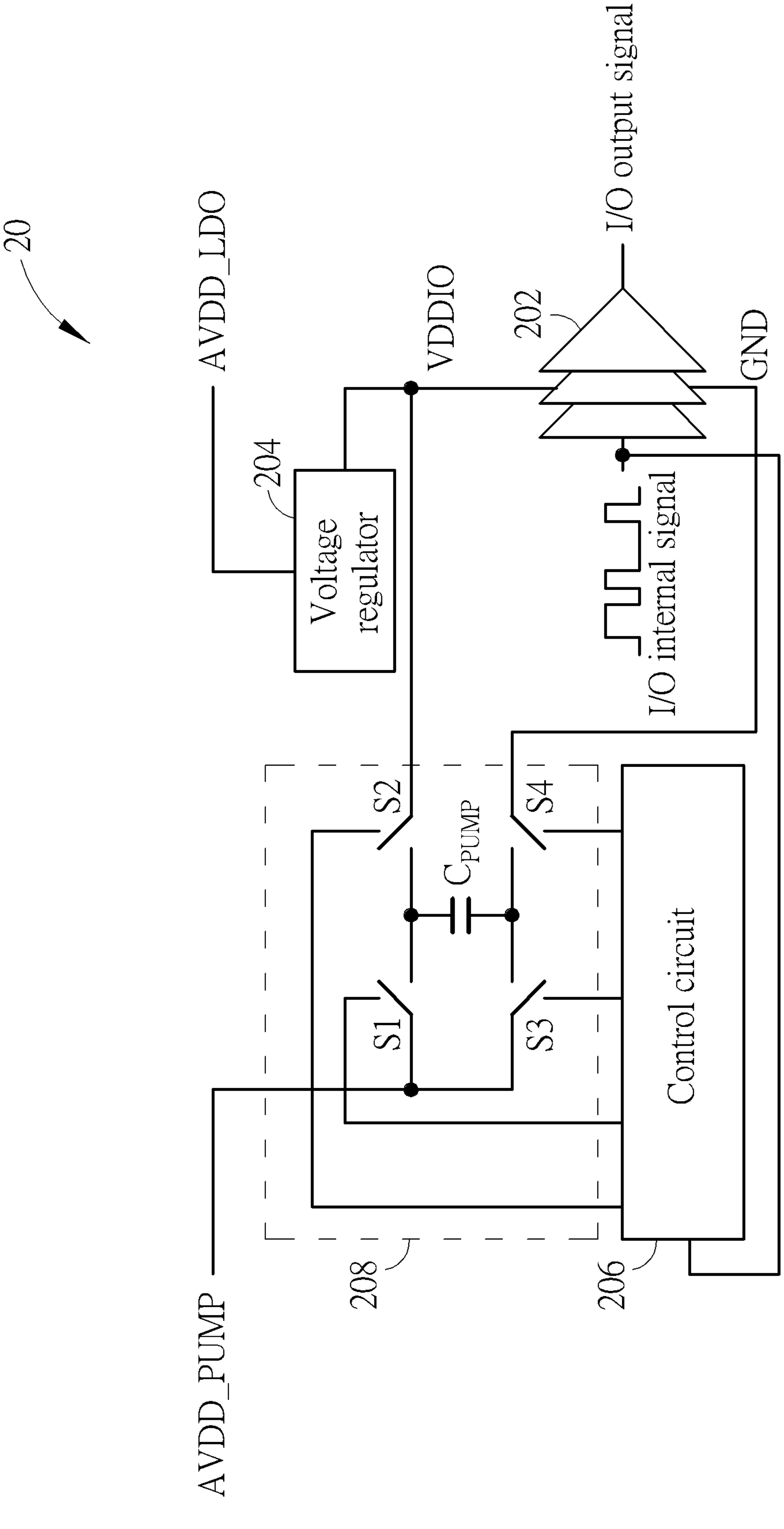
FIG. 5 is a schematic diagram of the output circuit with another exemplary implementation of the charge pump circuit.

FIG. 5 is a schematic diagram of the output circuit 20 with another exemplary implementation of the charge pump circuit 208. Similarly, the voltage regulator 204 may be an LDO regulator, which outputs the I/O power voltage VDDIO to the output driver 202 by receiving a source voltage AVDD LDO from a power supply device (not illustrated). The charge pump circuit 208 receives a source voltage AVDD_PUMP from the same or another power supply device, where the level of the source voltage AVDD_PUMP may be the same as or different from the level of the source voltage AVDD LDO.

As shown in FIG. 5, the charge pump circuit 208 includes four switches S1-S4 and a pumping capacitor $C_{PUMP}$. The implementations of the switches S1 and S2 are similar to those shown in FIG. 4, and will not be detailed herein. The switch S3 is coupled to the control circuit 206 and the voltage source that supplies the source voltage AVDD_PUMP, and the switch S4 is coupled to the control circuit 206 and the ground terminal. The pumping capacitor $C_{PUMP}$ is coupled between the switches S1-S4. More specifically, a terminal of the pumping capacitor $C_{pump}$ is coupled between the switches S1 and S2, and another terminal of the pumping capacitor $C_{pump}$ is coupled between the switches S3 and S4.

Figure 6:
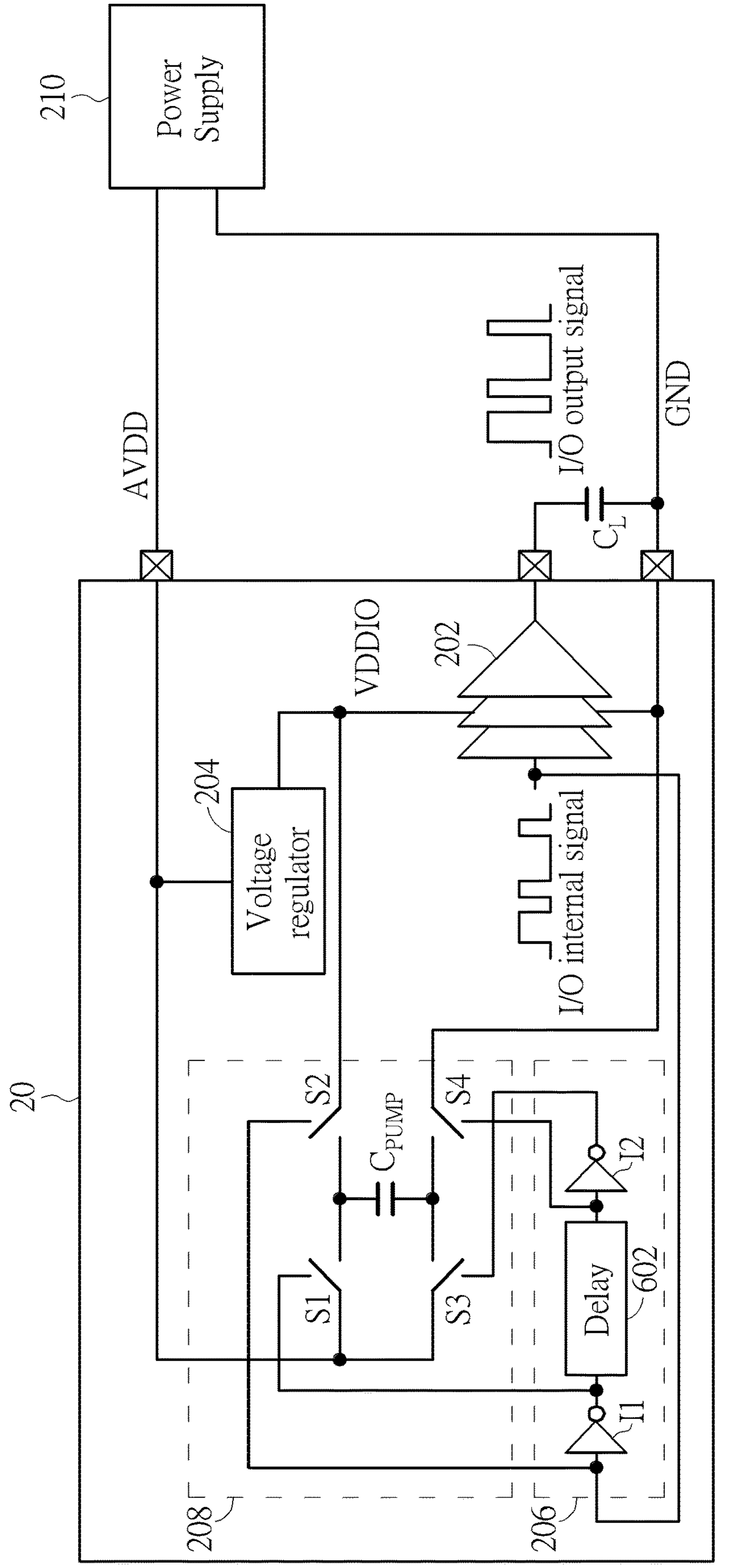
FIG. 6 is a schematic diagram of an exemplary implementation of the control circuit with a 4-switch structure of the charge pump circuit.

In this embodiment, the control circuit 206 may output control signals to control the switches S1-S4 according to the I/O internal signal of the output driver 202. Please refer to FIG. 6, which is a schematic diagram of an exemplary implementation of the control circuit 206 with a 4-switch structure of the charge pump circuit 208. As shown in FIG. 6, the control circuit 206 includes inverters I1 and I2 and a delay circuit 602. In detail, the control circuit 206 may receive the I/O internal signal of the output driver 202, and forward the I/O internal signal as the control signal for the switch S2. The inverter I1 may generate the control signal for the switch S1 by inverting the control signal for the switch S2. The delay circuit 602 may generate the control signal for the switch S4 by delaying the control signal for the switch S1. The inverter I2 may generate the control signal for the switch S3 by inverting the control signal for the switch S4. In this embodiment, the charge pump circuit 208 receives the source voltage AVDD from the power supply device 210, where the source voltage AVDD may provide electric charges for the pumping capacitor $C_{PUMP}$ of the charge pump circuit 208 and also provide power supply to control the voltage regulator 204 to operate normally.

FIGS. 7A-7D illustrate the operations of the switches S1-S4 in the charge pump circuit 208 according to an embodiment of the present invention. In detail, the waveforms of the I/O internal signal processed by the output driver 202 and the control signals for the switches S1-S4 are shown in FIGS. 7A-7D. The control signals in "High" level may turn on the corresponding switches, and in "Low" level may turn off the corresponding switches. The waveform of the I/O power voltage VDDIO is also shown in FIGS. 7A-7D to illustrate the improvement realized by the pumping compensation of the charge pump circuit 208.

Figure 7A:
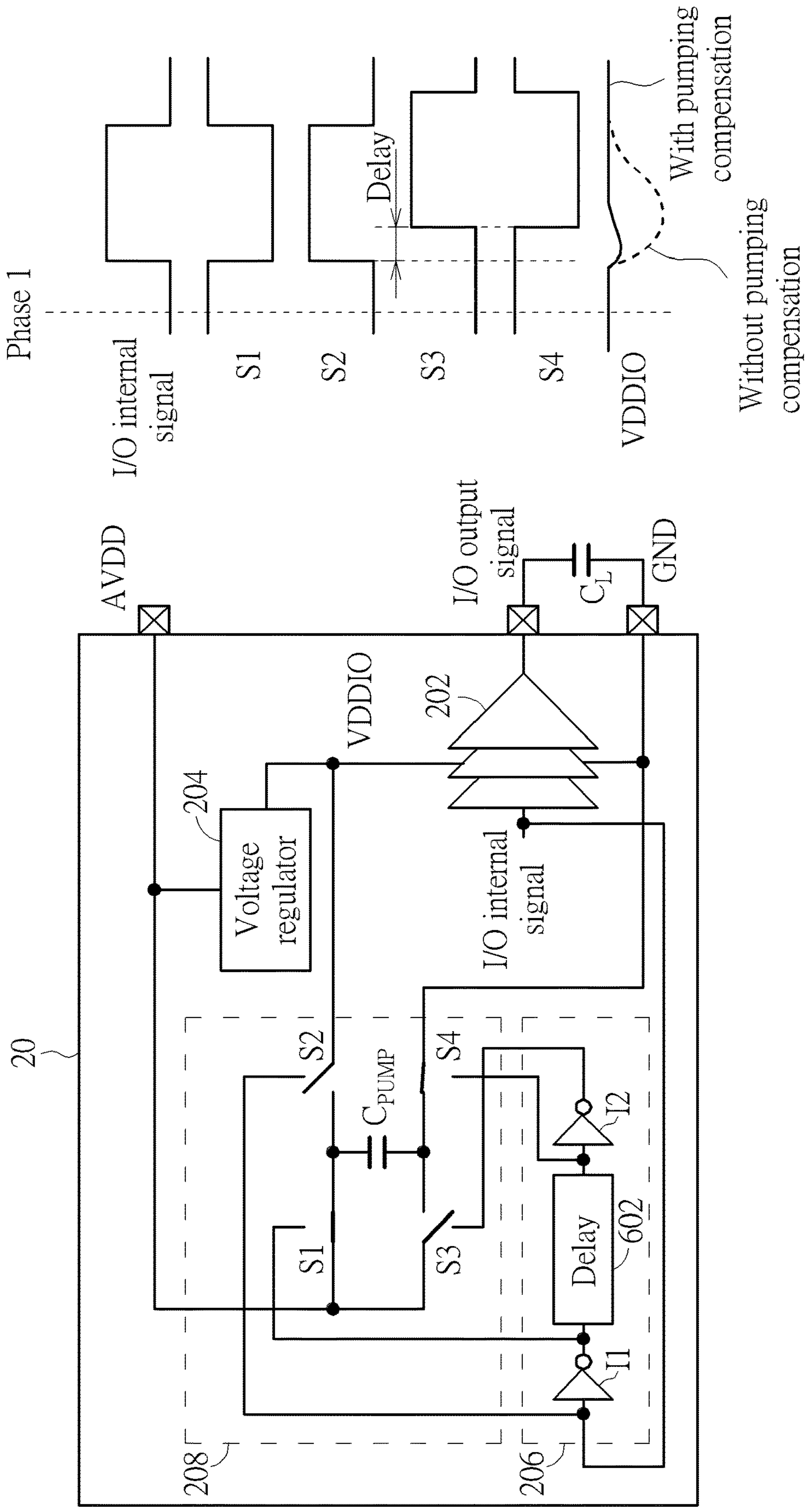
FIGS. 7A-7D illustrate the operations of the switches in the charge pump circuit according to an embodiment of the present invention.

FIG. 7A illustrates Phase 1, where the I/O internal signal of the output driver 202 is in the lower level. In this phase, the switches S1 and S4 are turned on and the switches S2 and S3 are turned off, and thus the pumping capacitor $C_{PUMP}$ is coupled between the power supply device 210 and the ground terminal, to receive compensation charges from the power supply device 210 through the source voltage AVDD.

Figure 7B:
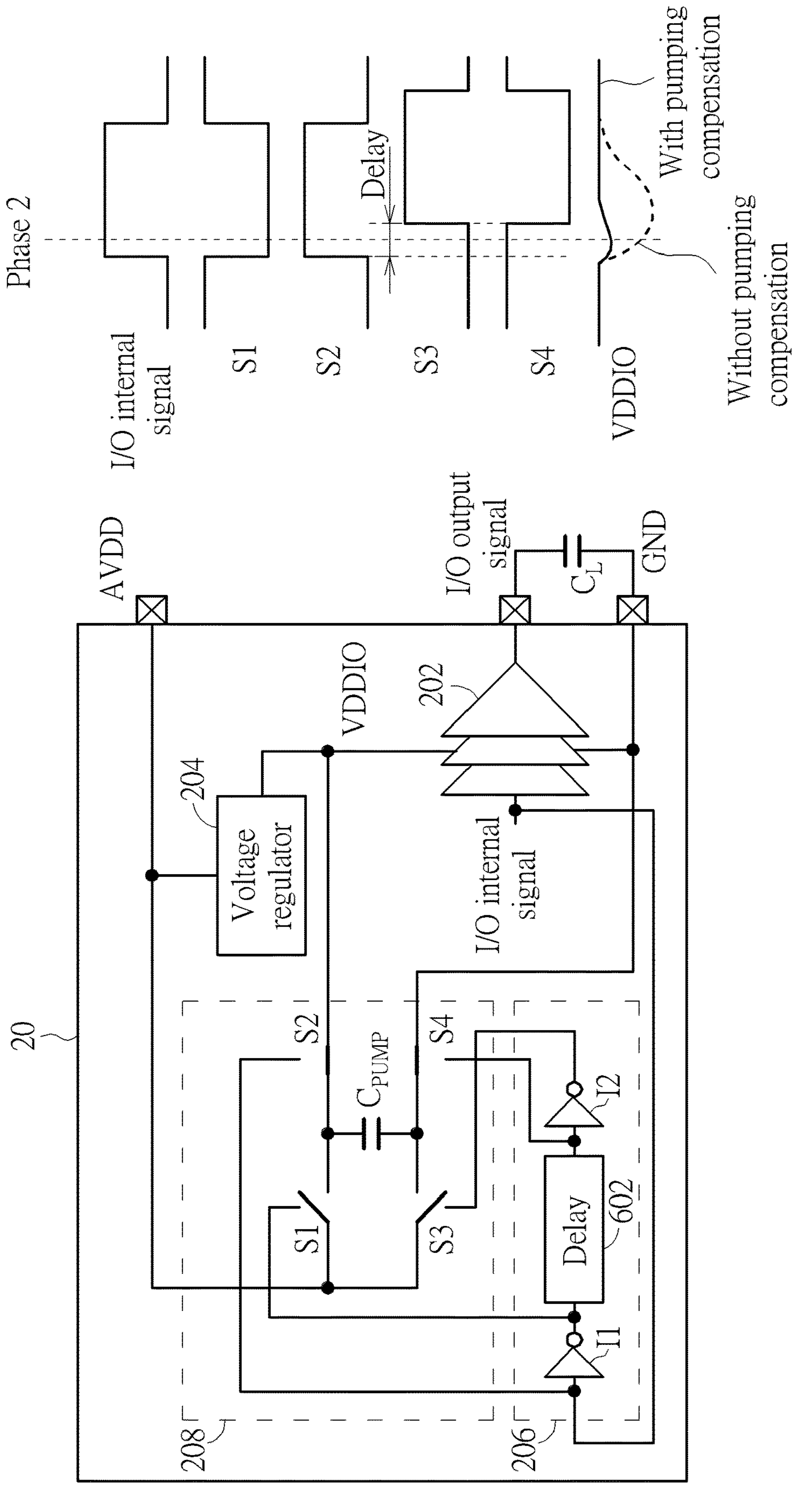

FIG. 7B illustrates Phase 2, where the I/O internal signal of the output driver 202 is switched from the lower level to the higher level. In this phase, the switches S2 and S4 are turned on and the switches S1 and S3 are turned off. More specifically, the switches S1 and S2 change their statuses following the switching of the I/O internal signal, while the switches S3 and S4 stay in their previous statuses due to the delay time generated by the delay circuit 602. Since the switch S2 is turned on, the compensation charges stored in the pumping capacitor $C_{pump}$ may be supplied to the power receiving terminal of the output driver 202 through the switch S2, so as to reduce the voltage drop on the I/O power voltage VDDIO.

Figure 7C:
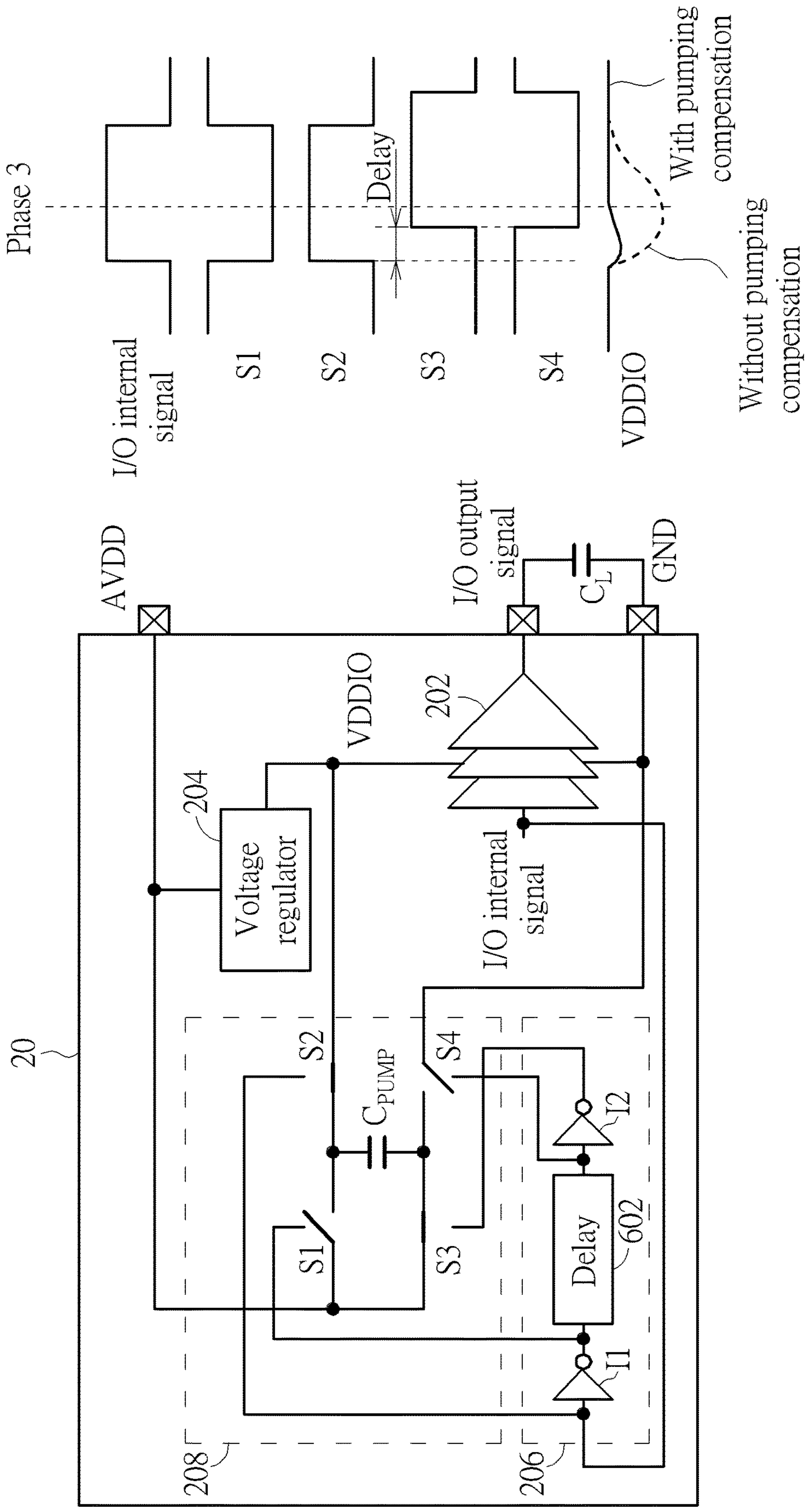

FIG. 7C illustrates Phase 3, where the I/O internal signal of the output driver 202 is still at the higher level. In this phase, the switches S2 and S3 are turned on and the switches S1 and S4 are turned off. More specifically, the switches S3 and S4 change their statues after the delay time of the delay circuit 602, while the switches S1 and S2 stay in their previous statues since the I/O internal signal is not switched from Phase 2 to Phase 3. Since the lower terminal of the pumping capacitor $C_{pump}$ is switched from the ground terminal to the power supply device 210, the voltage level rising from the ground voltage GND to the source voltage AVDD may be coupled to the power receiving terminal of the output driver 202, so as to supply more electric charges to the output driver 202.

Figure 7D:
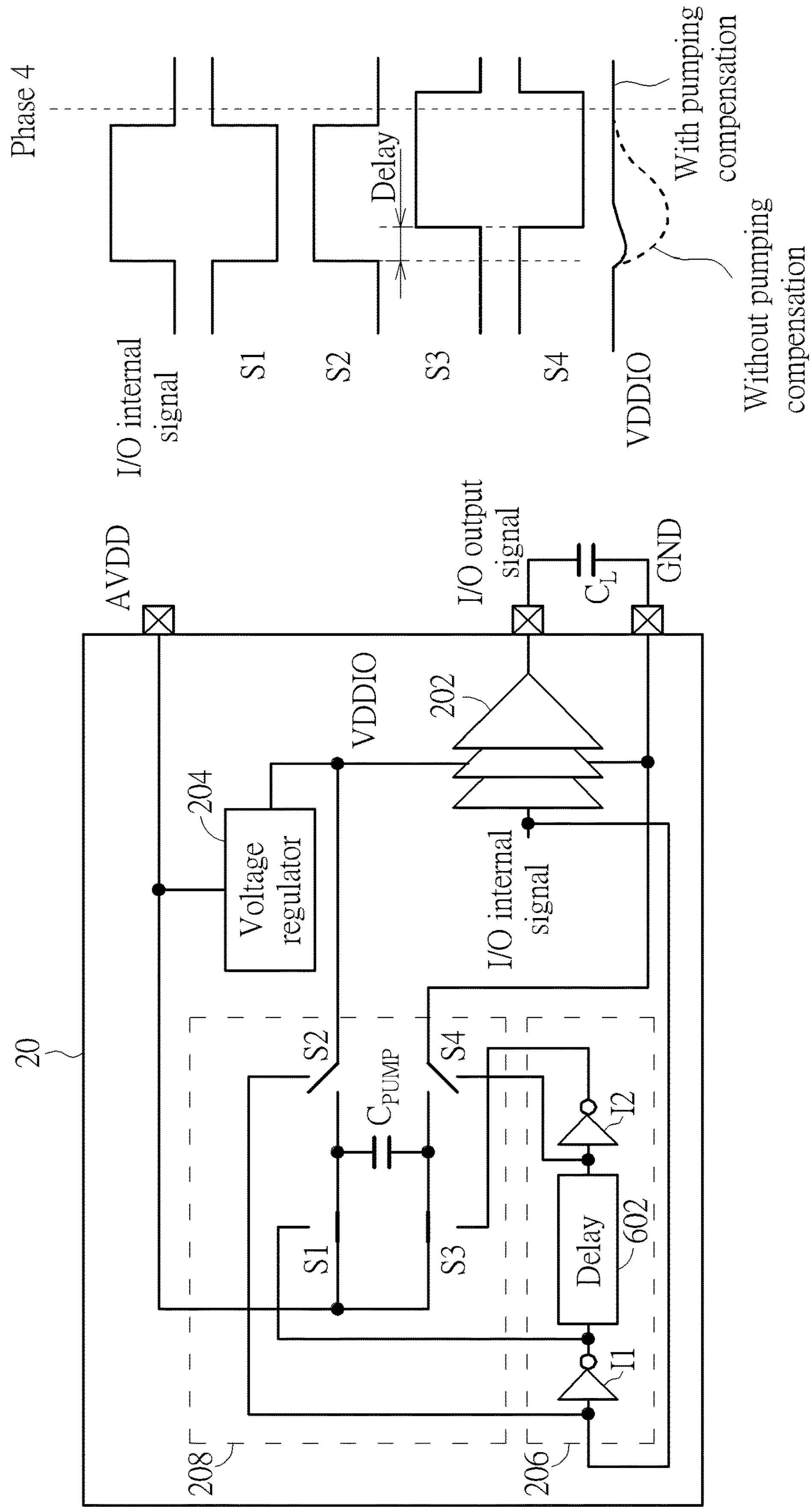

FIG. 7D illustrates Phase 4, where the I/O internal signal of the output driver 202 is switched from the higher level to the lower level. In this phase, the switches S1 and S3 are turned on and the switches S2 and S4 are turned off. More specifically, the switches S1 and S2 change their statuses following the switching of the I/O internal signal, while the switches S3 and S4 stay in their previous statuses due to the delay time generated by the delay circuit 602. Phase 4 may be a reset phase where the electric charges of the pumping capacitor $C_{PUMP}$ are reset. After the end of Phase 4, the pumping compensation process may return to Phase 1 to start the next cycle.

In this embodiment, the charge pump circuit 208 may supply electric charges in Phase 2 and also in Phase 3, so as to supply double electric charges as compared to the 2-switch structure of FIG. 4. In such a situation, a smaller capacitor with lower capacitance can support enough electric charges to reduce the voltage drop of the I/O power voltage VDDIO. For example, if the source voltage AVDD equals 3.3V and the I/O supply voltage VDDIO equals 1.8V, and the capacitance value of the capacitive load $C_L$ driven by the output driver 202 equals 100 picofarads (pF), the capacitance value of the pumping capacitor $C_{PUMP}$ may be calculated as follows:

$$C_{PUMP}=C_L\times VDDIO/(2\times AVDD)=27.27\text{ pF};$$

that is, the capacitance value 27.27 pF of the pumping capacitor $C_{PUMP}$ is enough to stabilize the I/O power voltage VDDIO, and its charge compensation capability is equivalent to an off-chip capacitor having tens of nanofarads (nF). As a result, the charge pump circuit of the present invention may entirely replace the off-chip capacitor, so that the off-chip capacitor may be omitted and a pad for connecting the off-chip capacitor may be saved.

Please note that the delay circuit 602 included in the control circuit 206 may separate the switching operations of the switches S1 and S2 and the switching operations of the switches S3 and S4. The delay circuit 602 may generate a delay time to let the electric charges to be supplied on two different time points (e.g., in Phase and Phase 3 as illustrated above). If the same quantity of compensation charges is supplied to the output driver 202 at the same time, the I/O supply voltage VDDIO may be boosted to an excessively high level. Therefore, the delay time of the delay circuit 602 allows electric charges of the pumping compensation to be supplied in a smoother way, so that the I/O supply voltage VDDIO may be stabilized at its target level instead of boosted excessively.

The delay circuit 602 may be realized in any manners. In an embodiment, the delay circuit 602 may include a delay chain composed of a plurality of inverters. Alternatively or additionally, the control circuit 206 may be composed of any control logic capable of generating appropriate control signals for controlling the switches SW1-SW4, and the implementations of the delay circuit 602 and/or the control circuit 206 are not served to limit the scope of the present invention. In an embodiment, the delay circuit 602 may be omitted in the control circuit 206.

Please note that the operations of the charge pump circuit of the present invention are different from the operations of a general charge pump. The general charge pump is usually configured to output a predetermined voltage level by receiving a periodic signal such as a clock signal, and the voltage may be boosted to a specific level based on the duty cycle of the clock signal and the level of the input voltage. In contrast, the charge pump circuit of the present invention is operated by receiving a digital I/O internal signal, which may be randomly switched between "High" and "Low" levels, and is usually different from the clock signal; hence, the electric charges are output only when the output driver needs to charge the capacitive load, e.g., the I/O output signal is switched to the higher level.

It should also be noted that the present invention aims at providing an output circuit using pumping compensation instead of the off-chip capacitor. Those skilled in the art may make modifications and alterations accordingly. For example, the pumping compensation may be applicable to any signal port needing to drive a large capacitive load, but not limited to an I/O interface. This signal port may be any type of transmission interface such as a universal serial bus (USB), inter-integrated circuit (I2C) interface, serial peripheral interface (SPI), and low voltage differential signaling (LVDS) interface. In the above embodiments, the charge pump circuit may have a 2-switch structure consisting of the switches S1-S2 and a 4-switch structure consisting of the switches S1-S4. In another embodiment, the switches S1-S2 may be omitted and only the switches S3-S4 are deployed in the charge pump circuit, and this implementation may also be feasible under appropriate switching control.

Further, the abovementioned voltage values are merely examples used to facilitate the illustration, not to limit the scope of the present invention. In the embodiment as shown in FIG. 6, the charge pump circuit 208 and the voltage regulator 204 receive the same source voltage AVDD from the same power supply device 210. In another embodiment, these circuit blocks may receive source voltages from different power supply devices or power sources. Note that the source voltage received by the charge pump circuit may be in any appropriate level capable of supplying electric charges to be stored in the pumping capacitor. With a higher level of the source voltage received by the charge pump circuit, a pumping capacitor with smaller capacitance is enough to supply the same quantity of compensation charges to stabilize the I/O supply voltage.

In a preferable embodiment, the quantity of compensation charges supplied from the charge pump circuit may be well controlled. Based on the magnitude of capacitive load driven by the output driver, the charge pump circuit may be configured to supply an adequate quantity of compensation charges, allowing the I/O supply voltage to be stabilized with minimum ripples without additional boosting. For example, the pumping capacitor may be a variable capacitor, and an optimal capacitance value of the pumping capacitor may be acquired through a training procedure, to be adaptive to any capacitive load.

Figure 8:
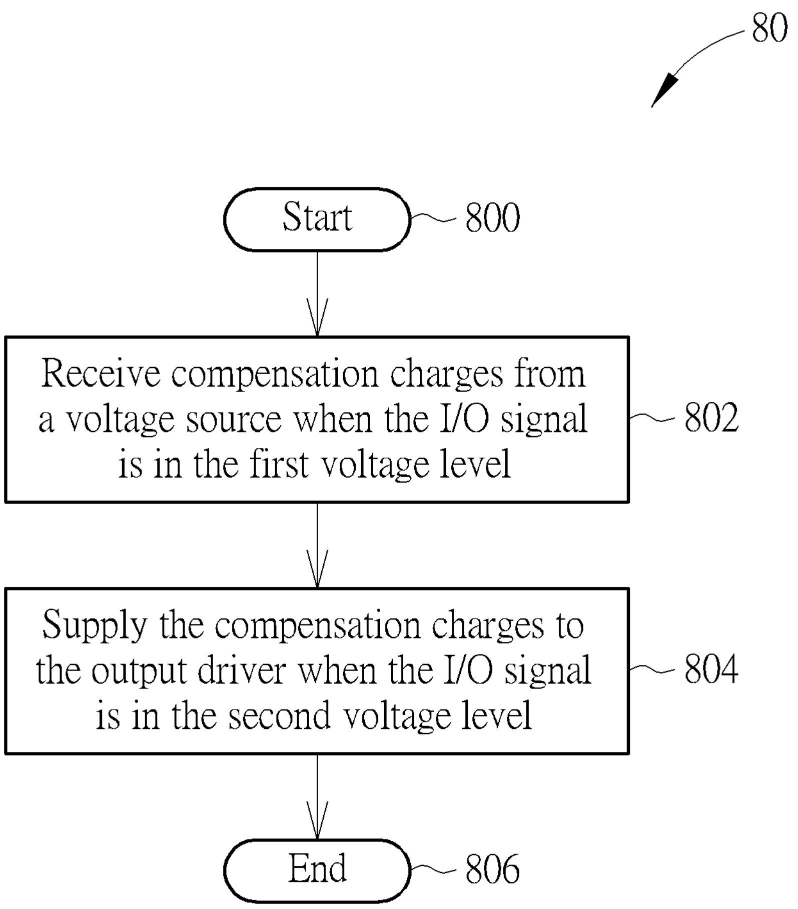
FIG. 8 is a schematic diagram of a pumping compensation process according to an embodiment of the present invention.

The abovementioned implementations and operations of the output circuit and the charge pump circuit may be summarized into a pumping compensation process 80, as shown in FIG. 8. The process may be implemented in a charge pump circuit for supplying compensation charges to an output driver processing an I/O signal, such as the charge pump circuit 208 illustrated in the above embodiments. As shown in FIG. 8, the pumping compensation process 80 includes the following steps:

Step 800: Start.

Step 802: Receive compensation charges from a voltage source when the I/O signal is in the first voltage level.

Step 804: Supply the compensation charges to the output driver when the I/O signal is in the second voltage level.

Step 806: End.

Please note that the steps of the pumping compensation process 80 may be applicable to a charge pump circuit having the 2-switch structure. If the 4-switch structure with the delay circuit is applied, the operations of supplying compensation charges may be performed in multiple phases. Also note that the I/O signal introduced in the process 80 may be the I/O internal signal or the I/O output signal as described above. In general, the waveforms of the I/O internal signal and the I/O output signal are similar, where they may have identical signal transition time points with different voltage levels. The related implementations are illustrated in FIGS. 7A-7D and related paragraphs, and will not be narrated herein.

To sum up, the present invention provides an output circuit and a related control method using pumping compensation. In the output circuit, the output driver is configured to drive a capacitive load by outputting an I/O output signal, and receive power supply from a voltage regulator. A charge pump circuit is coupled to the power receiving terminal of the output driver that receives power from the voltage regulator, to provide compensation charges for the output driver to charge the capacitive load. The charge pump circuit may be controlled based on the I/O internal signal processed by the output driver, allowing the compensation charges to be output when the I/O internal signal is switched to the higher voltage level and the capacitive load needs to be charged. The pumping operations of the charge pump circuit may generate and output enough electric charges to the output driver; hence, an off-chip capacitor may be omitted, and a pad for connecting the off-chip capacitor may also be saved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An output circuit, comprising:

an output driver, comprising a signal input terminal, a signal output terminal and a first power receiving terminal, to output a digital signal through the signal output terminal;

a voltage regulator, coupled to the first power receiving terminal of the output driver, to supply power to the output driver through the first power receiving terminal;

a control circuit, coupled to the signal input terminal of the output driver; and a charge pump circuit, coupled to the control circuit and the first power receiving terminal of the output driver, to output compensation charges to the output driver through the same first power receiving terminal;

wherein the charge pump circuit is configured to output the compensation charges to the first power receiving terminal of the output driver according to an input/output (I/O) internal signal of the output driver.

2. The output circuit of claim 1, wherein the charge pump circuit comprises:

a first switch, coupled to the control circuit and a voltage source;

a second switch, coupled to the control circuit and the first power receiving terminal of the output driver; and a pumping capacitor, coupled between the first switch and the second switch.

3. The output circuit of claim 2, wherein the control circuit is configured to generate control signals for controlling the first switch and the second switch according to the I/O internal signal of the output driver.

4. The output circuit of claim 1, wherein the output driver further comprises a second power receiving terminal, and the charge pump circuit comprises:

a first switch, coupled to the control circuit and a voltage source;

a second switch, coupled to the control circuit and the first power receiving terminal of the output driver;

a third switch, coupled to the control circuit and the voltage source;

a fourth switch, coupled to the control circuit and the second power receiving terminal of the output driver; and a pumping capacitor, coupled between the first switch, the second switch, the third switch and the fourth switch.

5. The output circuit of claim 4, wherein the control circuit is configured to generate control signals for controlling the first switch, the second switch, the third switch and the fourth switch according to the I/O internal signal of the output driver.

6. The output circuit of claim 1, wherein the voltage regulator is a low-dropout (LDO) regulator.

7. The output circuit of claim 1, wherein the output driver is configured to drive a digital output interface.

* * * * *